H. K. HOLSMAN.
DRIVE CHAIN.
APPLICATION FILED JULY 31, 1908.
959,532.
Patented May 31, 1910.
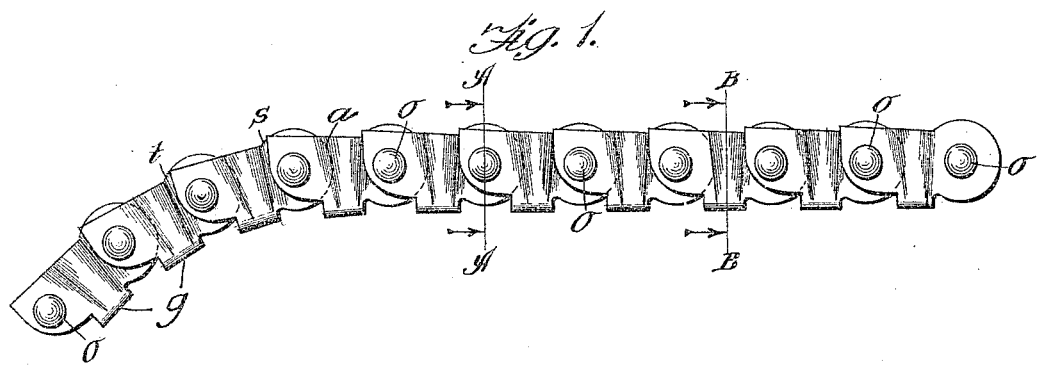
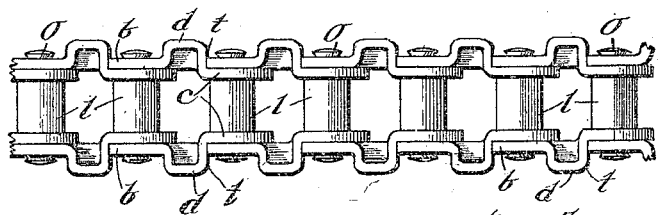
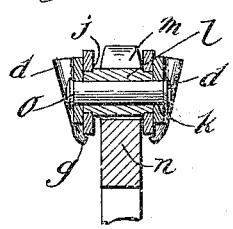
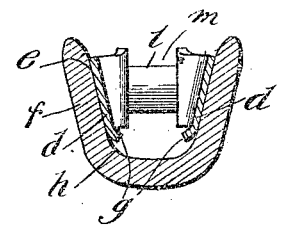
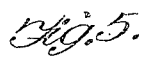
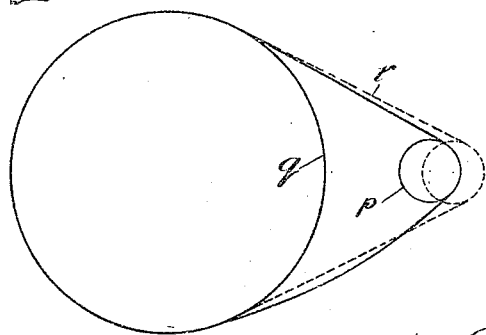
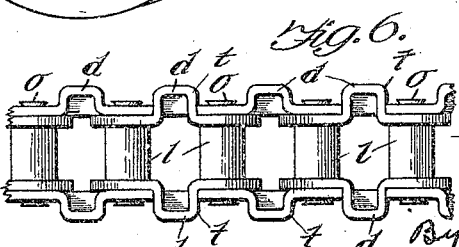

UNITED STATES PATENT OFFICE.

HENRY K. HOLSMAN, OF CHICAGO, ILLINOIS, ASSIGNOR TO INDEPENDENT HARVESTER COMPANY, A CORPORATION.

DRIVE-CHAIN.

959,532.  Specification of Letters Patent.  Patented May 31, 1910.

Application filed July 31, 1908. Serial No. 446,231.

*To all whom it may concern:*

Be it known that I, HENRY K. HOLSMAN, a citizen of the United States, and a resident of Chicago, in the county of Cook and State of Illinois, have invented certain new and useful Improvements in Drive-Chains, of which the following is a full, clear, and exact specification.

My invention is concerned with a novel drive chain which is adapted to be employed either for a frictional drive, as with a grooved pulley, or as a positive drive, with a sprocket wheel, or for both a positive and a frictional drive, where one of the connected members is a friction pulley and the other is a sprocket wheel.

To illustrate my invention, I annex hereto a sheet of drawings, in which the same reference characters are used to designate identical parts in all the figures, of which—

Figure 1 is a side elevation of a chain constructed in accordance with my invention; Fig. 2 is a top plan view of the same; Figs. 3 and 4 are sections on the lines A—A and B—B of Fig. 1, a portion of the sprocket wheel being shown in Fig. 3, and a section of the friction driving sheave in Fig. 4; Fig. 5 is a diagrammatic view illustrating the action of the stop surfaces for preventing the chain sagging on its upper run; and Fig. 6 is a view similar to Fig. 2, but showing a modification.

In carrying out my invention, I preferably form the side bars $a$ of sheet-metal, each side bar having the external surfaces in three planes, the plane of the surface $b$ overlapping the plane of the surface $c$ of the adjacent side bar, and the two surfaces being connected by the friction surface $d$, the plane of which is preferably slightly inclined, as shown, so that the two surfaces on the opposite sides of the chain converge in order to more securely engage the correspondingly converging - bearing surfaces $e$ of a friction sheave $f$ with which the chain is intended to coöperate. The side bars are also preferably provided with the downwardly and inwardly projecting continuations $g$ of the surface $d$, which continuations are curved to correspond with the curve $h$ in the bottom of the driving sheave. The side bars have the large holes $j$ in the surfaces $c$, and the smaller holes $k$ in the surfaces $b$, the holes $j$ being adapted to receive the sleeve $l$, which has its ends slightly reduced and offset, as shown in Fig. 3, so as to space the side bars apart the proper distance. The sleeve $l$ serves as the bearing surface to engage the teeth $m$ of the sprocket wheel $n$ when it is used for positive driving. The links are connected by the bearing pin $o$, which passes through the apertures $k$, and is preferably riveted in place.

The operation of my improved chain will be readily apparent, as when it is used for friction driving, the inclined surfaces $d$ coöperate with the correspondingly inclined surfaces $e$ of the sheave $f$, and are crowded into the same to cause it to engage and drive with a high degree of efficiency. When it coöperates with the sprocket wheel $n$, it acts just as an ordinary sprocket chain.

I have devised this chain primarily for driving the Holsman automobile, as shown in my Patent No. 697,720, and in this machine the driving sheave, indicated diagrammatically at $p$ in Fig. 5, rotates continuously, and has a grooved periphery, as shown in Fig. 4. The driven wheel $q$, indicated in Fig. 5, is provided with the same sort of a rim, and when the machine is being driven forward, the driving sheave is swung forward to the dotted-line position shown in Fig. 5, in which the chain is taut upon both sheaves, and the vehicle is driven forward. When the vehicle is to be brought to rest, the driving sheave $p$ is moved to the rear, as indicated in full lines in Fig. 5, in which the chain $r$ is loose, and the sheave $p$ rotates idly without advancing the chain $r$.

If an ordinary chain construction were employed, the chain would tend to sag on the upper run, and thus cause it to engage the driving sheave much more than it would if the chain were held straight, and thereby cause wear upon the chain and the sheave, while the latter was running and the car was at rest, and, accordingly, I preferably construct my chain so that it cannot sag on the upper run, and for this purpose I provide each of the side bars $a$ with the sharp shoulder $s$, which engages with the adjacent surface $t$ formed by the offset between the planes of the surfaces $c$ and $d$, so as to compel the chain to stand in a straight line on its upper run, in a manner which will be readily apparent, while permitting it to curve freely about the sheaves and to sag on the lower run.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. A drive chain consisting of overlapped metallic side bars having converging friction-drive bearing-surfaces extending in planes parallel to the length of the chain, and rivets, each connecting both the side bars of one link directly to the side bars of the adjacent link, said friction-drive bearing-surfaces being outside the planes of the ends of the rivets.

2. A drive chain consisting of overlapped metallic side bars having converging friction-drive bearing-surfaces extending in planes parallel to the length of the chain, and rivets, each connecting both the side bars of one link directly to the side bars of the adjacent link, and bearing sleeves between the side bars and through which the rivets pass, said friction-drive bearing-surfaces being outside the planes of the ends of the rivets.

3. A drive chain consisting of overlapped metallic side bars having converging friction-drive bearing-surfaces extending in planes parallel to the length of the chain and stop surfaces to prevent the chain from sagging on its upper run, and rivets, each connecting the side bars of one link directly to the side bars of the adjacent link, said friction drive bearing-surfaces being outside the planes of the ends of the rivets.

4. A drive chain consisting of overlapped metallic side bars having converging friction-drive bearing-surfaces extending in planes parallel to the length of the chain and stop surfaces to prevent the chain from sagging on its upper run, rivets, each connecting both the side bars of one link directly to the side bars of the adjacent link, and bearing sleeves between the side bars and through which the rivets pass, said friction-drive bearing-surfaces being outside the planes of the ends of the rivets.

5. A drive chain consisting of overlapped side bars, each side bar composed of a metal strip of substantially uniform thickness throughout and with the friction-drive bearing-surfaces extending beyond the ends of the connecting rivets, and rivets, each connecting both the side bars of one link directly to the side bars of the adjacent link.

6. A drive chain consisting of overlapped side bars, composed of metal strips of substantially uniform thickness throughout, and with converging friction-drive bearing-surfaces extending in planes parallel to the length of the chain and beyond the ends of the connecting rivets, and rivets, each connecting both the side bars of one link directly to the side bars of the adjacent link.

7. A drive chain consisting of overlapped side bars composed of metal strips of substantially uniform thickness throughout, with friction-drive bearing-surfaces extending beyond the ends of the connecting rivets, and each side bar having an engaging surface at one end adapted to coöperate with the offset made by the raised bearing surface of the adjacent link to prevent the chain from sagging on its upper run, and rivets, each connecting both side bars of one link directly to the side bars of the adjacent link.

8. A drive chain, composed of metal strips of substantially uniform thickness throughout, and with converging friction-drive bearing-surfaces, extending in planes parallel to the length of the chain and beyond the ends of the connecting rivets, and each side bar having an engaging surface at one end adapted to coöperate with the offset made by the raised bar surface of the adjacent link to prevent the chain from sagging on its upper run, and rivets, each connecting both the side bars of one link directly to the side bars of the adjacent link.

9. A drive chain consisting of overlapped side bars each having a small aperture at one end, a larger aperture at the other end, a raised friction-drive bearing-surface between said apertures, and an engaging surface at one end adapted to coöperate with the offset made by the raised bearing surface of the adjacent link to prevent the chain from sagging on its upper run, sleeves secured in the larger apertures, and rivets passing through the sleeves secured in the smaller apertures, said friction-drive surfaces extending beyond the ends of the rivets.

10. A combined sprocket and friction drive chain, consisting of overlapped side bars, each side bar composed of a metal strip with friction drive bearing surfaces extending beyond the ends of the connecting rivets, and rivets, each connecting both the side bars of one link directly to the side bars of the adjacent links, the links thus formed having sprocket-receiving apertures between the side bars and rivets, substantially as described.

11. A combined sprocket and friction drive chain, consisting of overlapped metallic side bars having converging friction drive bearing surfaces extending in planes parallel to the length of the chain, and rivets, each connecting both the side bars of one link directly to the side bars of the adjacent link, said friction drive bearing-surfaces being outside the planes of the ends of the rivets, and the links thus formed having sprocket-receiving apertures between the side bars and rivets.

12. A combined sprocket and friction drive chain, consisting of overlapped side bars, composed of metal strips of substantially uniform thickness throughout and with converging friction drive bearing-surfaces extending in planes parallel to the length of the chain and beyond the ends of the connecting rivets, and rivets, each connecting both side bars of one link directly to the side bars of the adjacent link, the links thus formed having sprocket-receiving apertures between the side bars and rivets.

In witness whereof, I have hereunto set my hand, and affixed my seal.

HENRY K. HOLSMAN. [L. S.]

Witnesses:
 JOHN H. McELROY,
 JNO. G. ELLIOTT.